(12) United States Patent
Axelsson et al.

(10) Patent No.: US 9,113,452 B2
(45) Date of Patent: Aug. 18, 2015

(54) METHOD AND ARRANGEMENT IN A WIRELESS COMMUNICATION NETWORK

(71) Applicant: Telefonaktiebolaget L M Ericsson (publ), Stockholm (SE)

(72) Inventors: Håkan Axelsson, Linköping (SE); Stefan Eriksson, Hässelby (SE); Anders Malm, Linköping (SE); Mårten Sundberg, Stockholm (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/230,082

(22) Filed: Mar. 31, 2014

(65) Prior Publication Data

US 2014/0211719 A1 Jul. 31, 2014

Related U.S. Application Data

(63) Continuation of application No. 12/866,686, filed as application No. PCT/SE2009/050132 on Feb. 9, 2009, now Pat. No. 8,724,730.

(60) Provisional application No. 61/028,029, filed on Feb. 12, 2008.

(51) Int. Cl.
*H04L 27/00* (2006.01)
*H04W 72/04* (2009.01)
*H04L 1/00* (2006.01)

(52) U.S. Cl.
CPC .............. *H04W 72/04* (2013.01); *H04L 1/008* (2013.01); *H04L 1/0072* (2013.01)

(58) Field of Classification Search
USPC ................. 375/365, 237, 238, 295, 227, 261; 370/310, 336; 455/67.13, 446
See application file for complete search history.

(56) References Cited

U.S. PATENT DOCUMENTS

| 6,522,665 | B1 | 2/2003 | Suzuki et al. |
| 8,155,115 | B2 | 4/2012 | Kallio et al. |
| 8,238,276 | B2 * | 8/2012 | Diachina et al. ............... 370/310 |
| 2002/0172163 | A1 * | 11/2002 | Chen et al. ..................... 370/281 |

(Continued)

FOREIGN PATENT DOCUMENTS

| CN | 1239616 A | 12/1999 |
| EP | 0944199 A1 | 9/1999 |
| EP | 1431919 A1 | 6/2004 |
| EP | 1489874 A2 | 12/2004 |
| EP | 1835670 A1 | 9/2007 |
| EP | 1871028 A1 | 12/2007 |
| JP | 2008523709 A | 7/2008 |
| KR | 20040049259 A | 6/2004 |
| RU | 2003135434 A | 5/2005 |
| RU | 2005130489 A | 1/2006 |
| RU | 2010137826 A | 3/2012 |
| WO | 0005844 A1 | 2/2000 |
| WO | 2004080067 A1 | 9/2004 |
| WO | 2007053069 A1 | 5/2007 |

*Primary Examiner* — Chieh M Fan
*Assistant Examiner* — Wednel Cadeau
(74) *Attorney, Agent, or Firm* — Coats & Bennett, PLLC

(57) ABSTRACT

Method, arrangement and computer program product in a base station for modulating information intended for transmission to a terminal. The base station and the terminal are comprised within a wireless communication network. The information comprises first and second data blocks, where two USF values are to be sent across the first data block and the second data block. The first data block and first parts of the two USF values are modulated with a first modulation technique and the second data block and second parts of the two USF values are modulated with a second modulation technique.

Further, a method, an arrangement and a computer program product in a terminal for demodulating information received from a base station are described. In addition, a method, an arrangement and a computer program product in a control node are described.

20 Claims, 10 Drawing Sheets

(56) References Cited

U.S. PATENT DOCUMENTS

| | | | |
|---|---|---|---|
| 2003/0202574 A1* | 10/2003 | Budka et al. ............... 375/227 |
| 2004/0150639 A1 | 8/2004 | Park et al. |
| 2008/0285523 A1 | 11/2008 | Bjorken |
| 2009/0232059 A1 | 9/2009 | Sundberg et al. |
| 2010/0322338 A1 | 12/2010 | Sundberg et al. |

* cited by examiner

Table 1

| USF value | USF codeword (GMSK) | USF codeword (8PSK) |
|---|---|---|
| 0 | 000 000 000 000 | 000000000 000000000 000000000 000000000 |
| 1 | 000 011 011 101 | 111110000 111100000 111111000 111110001 |
| 2 | 001 101 110 110 | 111001110 111011100 110000110 110001100 |
| 3 | 001 110 101 011 | 100111100 110000011 101110111 001001111 |
| 4 | 110 100 001 011 | 000110011 001011010 100001101 111111110 |
| 5 | 110 111 010 110 | 110101011 000110101 011101011 100101011 |
| 6 | 111 001 111 101 | 001001101 101111111 011010001 001110100 |
| 7 | 111 010 100 000 | 011010111 010101111 000111110 010010011 |

| USF value | USF codeword (GMSK + 8PSK) | USF codeword (8PSK + GMSK) |
|---|---|---|
| 0 | 000 000 000000000 000000000 | 000000000 000000000 000 000 |
| 1 | 000 011 111111000 111110001 | 111110000 111100000 011 101 |
| 2 | 001 101 110000110 110001100 | 111001110 111011100 110 110 |
| 3 | 001 110 101110111 001001111 | 100111100 110000011 101 011 |
| 4 | 110 100 100001101 111111110 | 000110011 001011010 001 011 |
| 5 | 110 111 011101011 100101011 | 110101011 000110101 010 110 |
| 6 | 111 001 011010001 001110100 | 001001101 101111111 111 101 |
| 7 | 111 010 000111110 010010011 | 011010111 010101111 100 000 |

Fig. 4

METHOD AND ARRANGEMENT IN A WIRELESS COMMUNICATION NETWORK

This application is a continuation application of pending U.S. application Ser. No. 12/866,686, filed 6 Aug. 2010, which is a National Phase of International Application PCT/SE2009/050132 filed 9 Feb. 2009, which in turn claims priority to U.S. Provisional Application No. 61/028,029, filed 12 Feb. 2008. The disclosures of each of these references are incorporated in their entireties by reference herein.

TECHNICAL FIELD

The present invention relates to a method and arrangement in a wireless communication network and, more in particular, to a mechanism for avoiding modulation segregation.

BACKGROUND

Enhanced Data rates for GSM Evolution (EDGE) is standardized as part of Third Generation Partnership Project (3GPP)/Global System for Mobile Telecommunications (GSM)/EDGE Radio Access Network (GERAN). GERAN/EDGE Evolution could be seen as a new packet of features as part of release 7 of the GERAN specifications. One part of that package is called EGPRS2, which introduces higher order modulations and higher symbols rates for both uplink and downlink. Another part of that package is called Reduced Latency and reduces the Time Transmit Interval (TTI) from 20 ms to 10 ms. The feature, often called Reduced TTI (RTTI), currently puts requirements on the downlink transmission in order to still support legacy pre-release 7 terminals. One such requirement forces two consecutive downlink blocks to be transmitted using the same modulation technique. Even though the blocks can be addressed to two different terminals, they both have to be transmitted using either of Gaussian Minimum Shift Keying (GMSK), 8-Phase-shift keying (8PSK), Quadrature Phase-Shift Keying (QPSK), 16-Quadrature Amplitude Modulation (16QAM) or 32-Quadrature Amplitude Modulation (32QAM) in order to be able to schedule a legacy terminal for transmission in the coming period.

The reason for this requirement is the downlink parameter called Uplink State Flag (USF) used to grant a particular terminal access to one, or more, uplink radio block(s). No matter what is sent on the downlink, the legacy as well as the RTTI terminal must be able to decode the USF if intended for the terminal.

The USF could be sent in both RTTI mode, or the legacy way, in Basic Transmission Time Interval (BTTI) mode i.e. mapped over four consecutive Time Division Multiple Access (TDMA) frames, thus e.g. 20 ms. The requirement on using the same modulation, as mentioned above, only applies to the BTTI USF mode when the USF is set to a used value. For RTTI USF mode any combinations of modulations on the two blocks are allowed. This is illustrated in FIG. 1. The left part of FIG. 1 shows the case when legacy radio blocks are sent in the downlink and the right the case when RTTI radio blocks are sent. As can be seen in the right part of FIG. 1, the USF is sent across two different downlink radio blocks. Using the existing technical solution, the USF bits must be sent using one and the same modulation in both radio blocks and hence, the two radio blocks must be sent using the same modulation.

The problem with the existing solution is that the ability to support legacy terminals puts requirements on the downlink scheduler. The downlink scheduler needs to use the same modulation in two consecutive blocks. It frequently results in non-optimal choice of modulation for any or both of the two downlink blocks. This problem is sometimes called modulation segregation.

SUMMARY

It is an object of embodiments of the present invention to provide a mechanism for improving the performance within a wireless communication network.

According to a first aspect, the object is achieved by a method, in a base station, for modulating information intended for transmission to a terminal. The base station, a control node, and the terminal are comprised within a wireless communication network. The information comprises a first data block and a second data block. The method comprises obtaining a first USF value and a second USF value to be sent across the first data block and the second data block. The method also comprises encoding first parts of the first and second USF values and the first data block for a first modulation technique. Additionally, the method comprises modulating the encoded first parts of the first and second USF values and the encoded first data block according to the first modulation technique. Also, the method comprises encoding second parts of the first and second USF values and the second data block for a second modulation technique, different from the first modulation technique, and modulating the encoded second parts of the first and second USF values and the encoded second data block according to the second modulation technique.

According to a second aspect, the object is also achieved by an arrangement in a base station for modulating information intended for transmission to a terminal. The base station, a control node, and the terminal are comprised within a wireless communication network. The information comprises a first data block and a second data block. The arrangement comprises an obtaining circuit, an encoder, and a modulator. The obtaining unit is adapted to obtain a first USF value and a second USF value to be sent across the first data block and the second data block. The encoding unit is adapted to encode first parts of the first and second USF values and the first data block for a first modulation technique, and to encode second parts of the first and second USF values and the second data block for a second modulation technique, different from the first modulation technique. The modulator is adapted to modulate the encoded first parts of the first and second USF values and the encoded first data block according to the first modulation techniques, and to modulate the encoded second parts of the first and second USF values and the encoded second data block according to the second modulation technique.

According to a third aspect, the object is also achieved by a computer program product associated with a base station. The computer program product comprises instructions for modulating information intended for transmission to a terminal. The base station, a control node, and the terminal are comprised within a wireless communication network. The information comprises a first data block and a second data block. The computer program product comprises instructions for obtaining a first USF value and a second USF value to be sent across the first data block and the second data block. Also, the computer program product comprises instructions for encoding first parts of the first and second USF values and the first data block for a first modulation technique, and modulating the encoded first parts of the first and second USF values and the encoded first data block according to the first modulation technique. In addition, the computer program product also comprises instructions for encoding second parts of the first and second USF values and the second data block for a second modulation technique, different from the first modulation technique. Further, the computer program product comprises instructions for modulating the encoded second parts of the first and second USF values and the encoded second data block according to the second modulation technique.

According to a fourth aspect, the object is achieved by a method, in a terminal, for demodulating information received from a base station. The base station and the terminal are comprised within a wireless communication network. The information comprises a first data block and a second data block. The method comprises receiving, from the base station, modulated first parts of first and second USF values, and a modulated first data block. Also, the method comprises demodulating the modulated first parts of the first and second USF values and the modulated first data block according to a first modulation technique. Further, the method comprises receiving, from the base station, modulated second parts of the first and second USF values and a modulated second data block. The method also comprises demodulating the modulated second parts of the first and second USF values and the modulated second data block according to a second modulation technique, different from the first modulation technique.

According to a fifth aspect, the object is also achieved by an arrangement in a terminal for demodulating information received from a base station. The base station and the terminal are comprised within a wireless communication network. The information comprises a first data block and a second data block. The arrangement comprises a receiver and a demodulator. The receiver is adapted to receive, from the base station, modulated first parts of first and second USF values, a modulated first data block, modulated second parts of the first and second USF values, and a modulated second data block. The demodulator is adapted to demodulate the modulated first parts of the first and second USF values and the modulated first data block according to a first modulation technique. The demodulator is further configured to demodulate the modulated second parts of the first and second USF values and the modulated second data block according to a second modulation technique, different from the first modulation technique.

According to a sixth aspect, the object is also achieved by a computer program product associated with a terminal. The computer program product comprises instructions for demodulating information received from a base station. The base station and the terminal are comprised within a wireless communication network. The information comprises a first data block and a second data block. The computer program product comprises instructions for receiving, from the base station, modulated first parts of a first USF value and a second USF value, and a modulated first data block. Also, the computer program product comprises instructions for demodulating the modulated first parts of the first and second USF values and the modulated first data block, according to a first modulation technique. In addition, the computer program product comprises instructions for receiving, from the base station, modulated second parts of the first and second USF values and a modulated second data block. Still further, the computer program product comprises instructions for demodulating the modulated second parts of the first and second USF values and the modulated second data block, according to a second modulation technique, different from the first modulation technique.

According to a seventh aspect, the object is achieved by a method in a control node for supporting a base station in modulating information intended for transmission from the base station to a terminal. The control node, the base station, and the terminal are comprised within a wireless communication network. The information data comprises a first data block and a second data block. The method comprises providing, to the base station, first modulation information associated with the first data block and second modulation information associated with the second data block. The second modulation information is different from the first modulation information. Also, the method further comprises providing, to the base station, a first USF value and a second USF value. A first part of each of the first and second USF values are associated with the first data block to be modulated at the base station according to the first modulation information. A second part of each of the first and second USF values are associated with the second data block to be modulated at the base station according to the second modulation information.

According to an eighth aspect, the object is also achieved by an arrangement in a control node for supporting a base station in modulating information intended for transmission from the base station to a terminal. The control node, the base station, and the terminal are comprised within a wireless communication network. The information comprises a first data block and a second data block. The arrangement comprises a first providing circuit and a second providing circuit. The first providing circuit is adapted to provide, to the base station, first modulation information associated with the first data block and second modulation information associated with the second data block. The second modulation information is different from the first modulation information. The second providing unit is adapted to provide, to the base station, a first USF value and a second USF value. A first part of each of the first and second USF values are associated with the first data block to be modulated at the base station according to the first modulation information. A second part of each of the first and second USF values are associated with the second data block to be modulated according to the second modulation information.

According to a ninth aspect, the object is also achieved by a computer program product associated with a control node. The computer program product comprises instructions for modulating information intended for transmission from a base station to a terminal. The control node, the base station, and the terminal are comprised within a wireless communication network. The information comprises a first data block and a second data block. The computer program product comprises instructions for providing, to the base station, first modulation information associated with the first data block and second modulation information associated with the second data block. The second modulation information is different from the first modulation information. Also, the computer program product comprises instructions for providing, to the base station, a first USF value and a second USF value. A first part of each of the first and second USF values is associated with the first data block to be modulated at the base station according to the first modulation information, and wherein a second part of each of the first and second USF values is associated with the second data block to be modulated according to the second modulation information.

Thanks to the present methods, arrangements and computer program products, it is possible to modulate each transmitted data block using the at the moment most accurate modulation technique, when start transmitting each data block. This is accomplished by modifying the uplink scheduling parameters in such a way that the downlink scheduler can work freely without risk of introducing modulation segregation. In one example embodiment, different modulations are used in two consecutive RTTI radio blocks. Thereby increased spectrum and hardware utilization is generated.

This improves spectrum efficiency but still gives support for legacy terminals when introducing the feature Reduced Latency. Thus an improved performance within a wireless communication network is provided.

Other objects, advantages and novel features of the invention will become apparent from the following detailed description of the invention.

BRIEF DESCRIPTION OF THE DRAWINGS

The present invention will now be described more in detail in relation to the enclosed drawings, in which:

FIG. 4 is an illustration over two tables. Table 1 illustrates currently specified USF codewords; Table 2 illustrates an example of mixed modulation codewords according to the present method.

DETAILED DESCRIPTION

The present solution is defined as a method, a computer program product and an arrangement in a base station, a method, a computer program product and an arrangement in a terminal, and a method, a computer program product and an arrangement in a control node, which may be put into practice in the embodiments described below. The present solution may, however, be embodied in many different forms and should not be construed as limited to the embodiments set forth herein; rather, these embodiments are provided so that this disclosure will be thorough and complete, and will fully convey the scope of the present solution. It should be understood that there is no intent to limit the present methods, computer program products and/or arrangements to any of the particular forms disclosed, but on the contrary, the present methods, computer program products and arrangements are to cover all modifications, equivalents, and alternatives falling within the scope of the present solution as defined by the claims.

The present solution may, of course, be carried out in other ways than those specifically set forth herein without departing from essential characteristics of the solution. The present embodiments are to be considered in all respects as illustrative and not restrictive, and all changes coming within the meaning and equivalency range of the appended claims are intended to be embraced therein.

Figure 2:
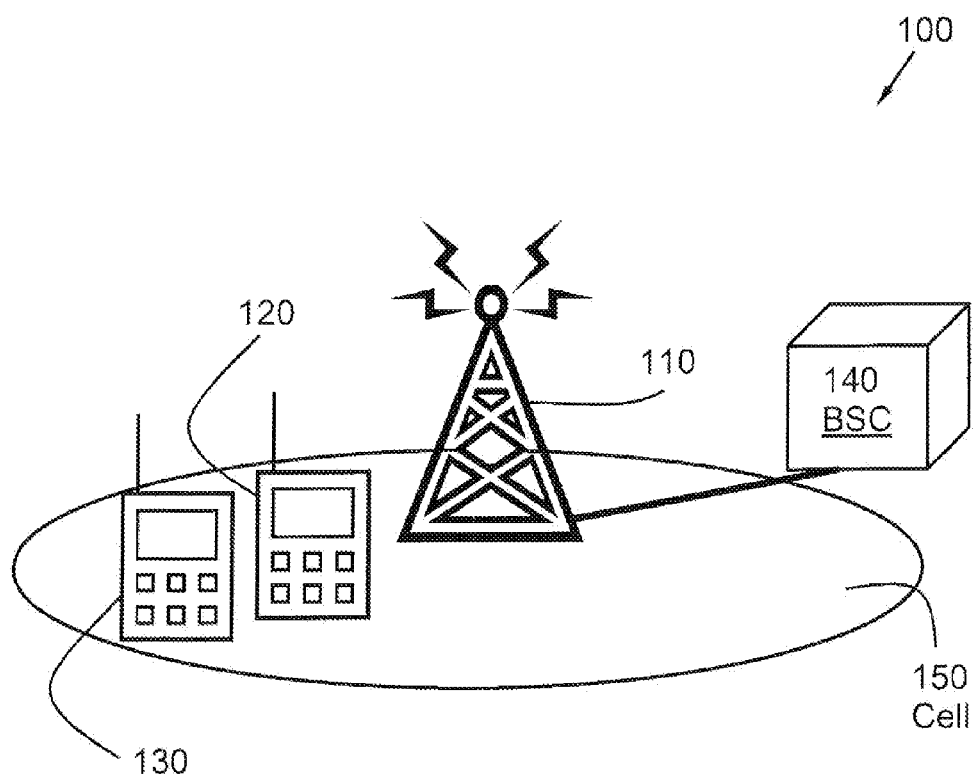
FIG. 2 is a block diagram illustrating a wireless communication network.

FIG. 2 is a schematic illustration over a wireless communication network 100. The wireless communication network 100 comprises at least one base station 110 and is arranged to comprise a plurality of terminals 120, 130. The base station 110 may send and receive wireless signals to and from the terminals 120, 130 situated within the cell 150. The wireless communication network 100 further comprises a control node 140.

Although only one base station 110 is shown in FIG. 2, it is to be understood that another configuration of base station transceivers may be connected through, for example, a mobile switching centre and other network nodes, to define the wireless communication network 100. Further, the base station 110 may be referred to as e.g. a Remote Radio Unit, an access point, a Node B, an evolved Node B (eNode B) and/or a base transceiver station, Access Point Base Station, base station router, etc depending e.g. of the radio access technology and terminology used.

In some embodiments, the terminal 120, 130 may be represented by a wireless communication device, a wireless communication terminal, a mobile cellular telephone, a Personal Communications Systems terminal, a mobile station (MS), a Personal Digital Assistant (PDA), a laptop, a User Equipment (UE), computer or any other kind of device capable of managing radio resources.

The wireless communication network 100 may be based on technologies such as e.g. Global System for Mobile Telecommunications (GSM), Enhanced Data rates for GSM Evolution (EDGE), General Packet Radio Service (GPRS), Code Division Multiple Access (CDMA), Wideband Code Division Multiple Access (WCDMA), CDMA 2000, High Speed Downlink Packet Data Access (HSDPA), High Speed Uplink Packet Data Access (HSUPA), High Data Rate (HDR) High Speed Packet Data Access (HSPA), Universal Mobile Telecommunications System (UMTS) etc, just to mention some few arbitrary and none limiting examples.

Further, as used herein, the wireless communication network 100 may further, according to some embodiments, refer to Wireless Local Area Networks (WLAN), such as Wireless Fidelity (WiFi) and Worldwide Interoperability for Microwave Access (WiMAX), Bluetooth or according to any other wireless communication technology.

It is to be noted however, that the present solution is not in any way limited to be performed exclusively over a radio interface within the wireless communication network 100, but may be performed within a wireless communication network 100 where some nodes are wirelessly connected and some nodes have a wired connection.

However, according to some particular, non limiting embodiments, the wireless communication network 100 may be adapted to operate in accordance with Reduced Latency within the GERAN Evolution and/or EGPRS2.

The control node 140 may be e.g. a Base Station Controller (BSC). The control node 140 is a governing element in the wireless communication network 100, responsible for control of base stations 110, which are connected to the control node 140. The control node 140 may further for example carry out radio resource management; some of the mobility management functions and may e.g. provide modulation information associated with information data to be sent from the base station 110 to the terminal 120, 130 and/or provide an USF value, just to mention some brief examples illustrating some possible functionalities of the control node 140.

Figure 1:
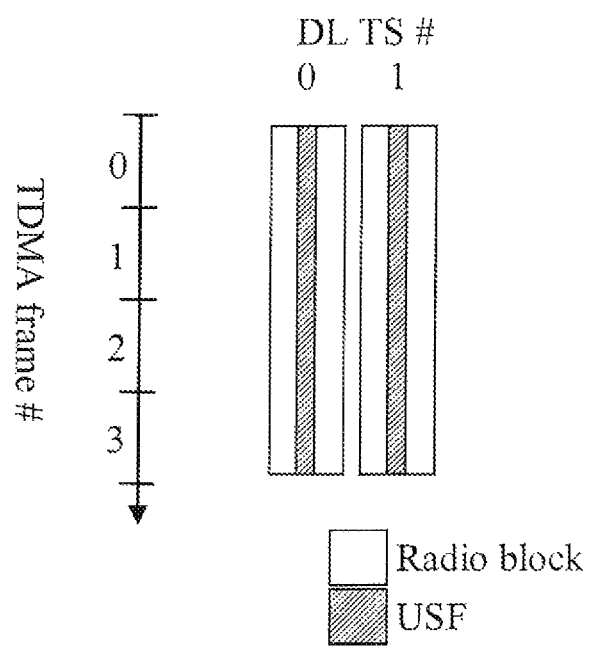
FIG. 1 is a schematic block diagram illustrating USF mapping according to prior art.

The terminal 120 may further communicate with other terminals such as e.g. the terminal 130, or with other terminals not shown in FIG. 1, via the base station 110 comprised within the wireless communication network 100.

The base station 110 is further adapted to schedule the uplink transmissions from the terminals 120, 130. In order to grant a terminal 120 access to a particular uplink resource, Uplink State Flag (USF) values are sent from the base station 110 to the terminal 120, together with any downlink data sent to the terminal 120, or to any other terminal 130, as will be further explained more in detail in connection with FIG. 3.

The expression "downlink" is here used to specify the transmission from the base station 110 to the terminal 120, 130, while the expression "uplink" is used to denote the transmission from the terminal 120, 130 to the base station 110.

Figure 3:
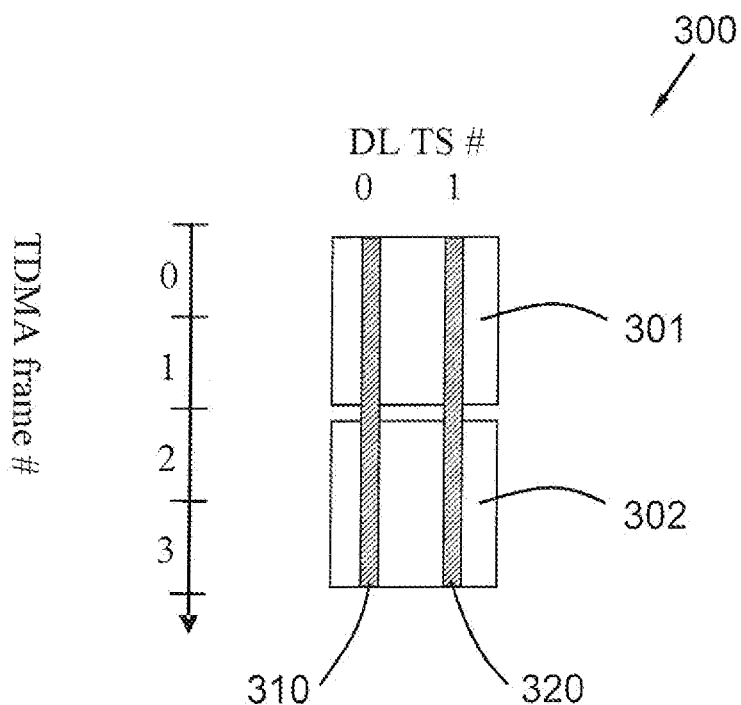
FIG. 3 is a schematic block diagram illustrating USF mapping according to embodiments of the present method.

FIG. 3 is a schematic block diagram illustrating USF mapping according to some embodiments of the present method. Information data 300 comprises a first data block 301 and a second data block 302. A first USF 310 and a second USF 320 are sent across the first data block 301 and the second data block 302. The first and second USF 310, 320 in BTTI USF mode are, according to the presently standardized protocol, mapped over four consecutive TDMA frames, i.e. 20 ms.

The basic concept of the present solution is to arrange the uplink scheduling parameters in such a way that the downlink scheduler can work freely without risk of introducing modulation segregation, i.e. it can use different modulations in two consecutive RTTI radio blocks 301, 302. The two consecutive RTTI radio blocks, 301 and 302, may be transmitted to the same terminal 120 or to different terminals 120, 130, such that e.g. the first RTTI radio block 301 is transmitted to a first terminal 120 and the second RTTI radio block 302 is transmitted to a second terminal 130.

In order for the terminal 120, 130 to be able to read and decode the first USF 310 and the second USF 320 used for uplink scheduling, transmitted by means of different modulation techniques, new USF code words may be defined and standardized.

The USF codewords according to the present solution are defined in such a way that it is possible to transmit the first part of a USF codeword with one modulation and the second part with another modulation.

Thus, consequently, as the first parts of the first USF 310 and the second USF 320 are sent across the first data block 301 and the second part of the first USF 310 and the second USF 320 are sent across the second data block 302, each data block 301, 302 and corresponding part of the first USF 310 and the second USF 320 may be modulated using the for the moment most appropriate modulation technique for each block. The most appropriate modulation technique may be selected based e.g. on the radio propagation conditions.

According to the present methods, new USF codewords are defined for all possible combinations of e.g. the following non-exhaustive list of possible modulation techniques: Gaussian Minimum Shift Keying (GMSK), 8-Phase-shift keying (8PSK), 16-Quadrature Amplitude Modulation (16QAM) and 32-Quadrature Amplitude Modulation (32QAM) at normal symbol rate, or Quadrature Phase-Shift Keying (QPSK), 16-Quadrature Amplitude Modulation (16QAM) and 32-Quadrature Amplitude Modulation (32QAM) at high symbol rate.

The USF codewords may further according to some embodiments be constructed to optimize the error correcting capability of the code, taking into account that one modulation technique may be more robust than the other. According to some embodiments, the USF codewords may be constructed by using the currently specified USF code words and applying different modulation techniques on the two USF codewords halves, as will be further explained in association with FIG. 4.

FIG. 4 reveals two tables, Table 1 and Table 2.

Table 1 illustrates currently specified USF codewords. The first column comprises a USF value 310 between 0 and 7 to be transmitted to the terminal 120. The second column illustrates how a particular USF value 310, 320 is encoded into a USF codeword according to the modulation technique GMSK. The third column illustrates a particular USF value 310, 320 encoded into a USF codeword according to the modulation technique 8PSK. Table 1 thus illustrates how such modulation is performed according to prior art solutions.

Table 2 illustrates an example of mixed modulation codewords according to embodiments of the present method. The USF codewords are constructed by using the currently specified USF codewords in the following manner:

The USF values 310, 320 to be transmitted from the base station 110 to the terminal 120, a number between 0 and 7, the modulation technique to be used in the first 10 ms data block 301 and the modulation technique to be used in the second 10 ms data block 302 are obtained. According to some embodiments, the enumerated parameters may be obtained from the control node 140.

Thus, first half of the USF codeword is modulated with the same modulation technique as used for modulating the first data block 301, here GMSK. In addition, the value of the first part of the USF codeword is selected based on the modulation of the first data block 301, here GMSK. The second half of the USF codeword is modulated with the modulation technique used for modulating the second data block 302, here 8PSK. In addition, the value of the second part of the USF codeword is selected based on the modulation of the second data block 302, here 8PSK. It is to be noticed that the use of the modulation techniques GMSK and 8PSK is here mentioned and depicted in FIG. 4 for the mere purpose of illustrating the present inventive concept of constructing new USF codewords. However, new USF codewords may according to the present solution be constructed by combining the first half of the USF codeword modulated with any modulation technique within the group: GMSK, 8PSK, 16QAM and 32QAM at normal symbol rate; QPSK, 16QAM and 32QAM at high symbol rate, with the second half of the USF codeword modulated with any other modulation technique within the same group of enumerated modulation techniques.

According to some embodiments, the first data block 301 and the first half of the USF codeword may be sent during the first 10 ms of the transmission and the second data block 302 and the second half of the USF codeword may be sent during the following 10 ms of the transmission.

On the receiver side, the terminal 120 demodulates the first data block 301 using the first modulation technique and the second data block 302 using the second modulation technique. The received information corresponding to the encoded USFs 310 and 320 is extracted from each half, such that the first half of the first USF 310 and the second USF 320 are demodulated using the first modulation technique and the second half of the first USF 310 and the second USF 320 are demodulated using the second modulation technique. The first USF 310 and the second USF 320 may then be decoded by adding the two respective demodulated parts of the first USF 310 and the second USF 320.

The terminal 120 may further indicate, according to some optional embodiments, support for this feature implicitly by indicating support of related features, such as Reduced Latency and/or EGPRS2. Such indication may further optionally be transmitted to the base station 110, with certain advantage e.g. before the downlink data blocks 301, 302 are to be transmitted from the base station 110 to the terminal 120. Thereby, the base station 110 receives information concerning if the data blocks 301, 302 that are to be sent to the terminal 120 may be transmitted using the same modulation technique or if the second data block 302 may be modulated differently than the first data block 301.

Figure 5:
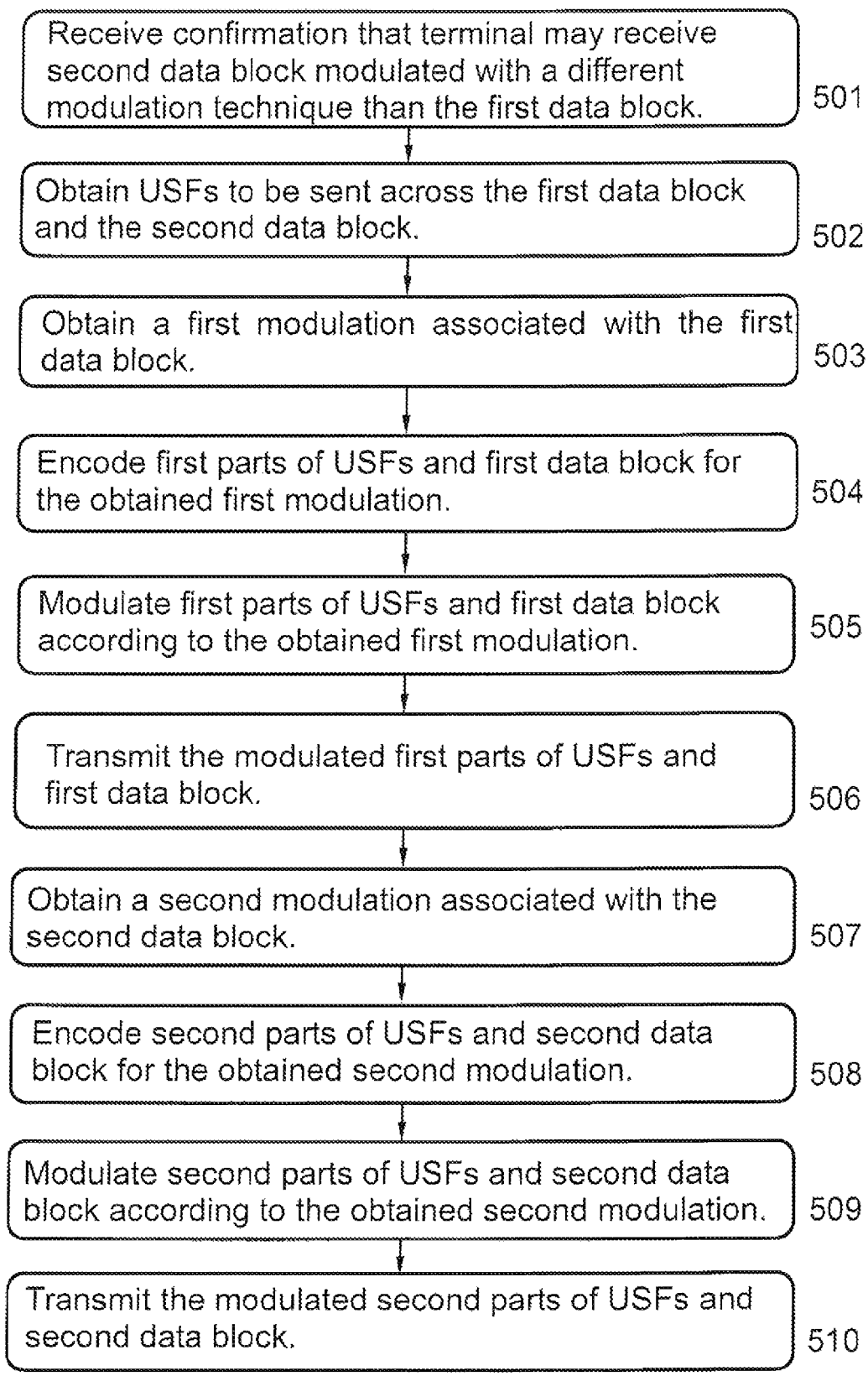
FIG. 5 is a schematic flow chart illustrating embodiments of a method in a base station.

FIG. 5 is a flow chart illustrating embodiments of method steps 501-510 performed in a base station 110. The method aims at transmitting information data 300 to a terminal 120. The base station 110 and the terminal 120 are comprised within a wireless communication network 100. The wireless communication network 100 may further comprise a control node 140 and/or a further terminal 130. The information data 300 comprises a first data block 301 and a second data block 302. The first and second data blocks 301, 302 are arranged to be transmitted to the same terminal 120 or to different terminals 120, 130.

To appropriately transmit information data 300 to the terminal 120, the method may comprise a number of method steps 501-510.

It is however to be noted that some of the described method steps 501-510 are optional and only comprised within some embodiments. Further, it is to be noted that the method steps 501-510 may be performed in any arbitrary chronological order and that some of them, e.g. step 501 and step 502, or even all steps 501-510 may be performed simultaneously or in an altered, arbitrarily rearranged, decomposed or even completely reversed chronological order, according to different embodiments. The method may comprise the following steps:

Step 501

This step is optional and may only be performed within some embodiments.

A confirmation may be received from the terminal 120 confirming that the terminal 120 is adapted to receive the second data block 302 modulated with a different modulation technique than the first data block 301, according to some embodiments.

The optional confirmation may indicate support and/or capability for e.g. Reduced Latency and/or EGPRS2. Thus it may not explicitly be necessary to confirm that mixed modulations USF is supported, as the feature of mixed modulations USF is supported by terminals 120, 130 supporting Reduced Latency and/or EGPRS2.

Thereby, the base station 110 may receive information concerning if the data blocks 301, 302 that are to be sent to the terminal 120 may be transmitted using the same modulation technique or if the second data block 302 may be modulated differently than the first data block 301.

Step 502

A first USF 310 and a second USF 320, to be sent across the first data block 301 and the second data block 302 are obtained.

The first USF 310 and the second USF 320 may, according to some embodiments, be obtained from the control node 140.

Step 503

A first modulation technique, associated with the first data block 301 is obtained.

The modulation technique associated with the first data block 301 may according to some optional embodiments be any modulation technique of: Gaussian Minimum Shift Keying (GMSK), 8-Phase-shift keying (8PSK), 16-Quadrature Amplitude Modulation (16QAM) and 32-Quadrature Amplitude Modulation (32QAM) at normal symbol rate, or Quadrature Phase-Shift Keying (QPSK), 16-Quadrature Amplitude Modulation (16QAM) and 32-Quadrature Amplitude Modulation (32QAM) at high symbol rate.

The modulation technique associated with the first data block 301 may be obtained from the control node 140, according to some embodiments.

Step 504

A first part of the obtained first and second USF 310, 320 and the first data block 301 for the obtained first modulation technique are encoded.

Step 505

The encoded first part of the first and second USF 310, 320 and the encoded first data block 301, are modulated according to the obtained first modulation technique.

Step 506

The modulated first part of the first and second USF 310, 320 and the modulated first data block 301 to the terminal 120 are transmitted to the terminal 120.

The first data block 301 is to be sent during the first 10 ms of transmission together with the first part of the first and second USF 310, 320, according to some embodiments.

Step 507

A second modulation technique associated with the second data block 302 is obtained.

The modulation technique associated with the second data block 302 may according to some optional embodiments be any modulation technique of: GMSK, 8PSK, 16QAM and 32QAM at normal symbol rate, or QPSK, 16QAM and 32QAM at high symbol rate.

The modulation technique associated with the second data block 302 may be obtained from the control node 140, according to some embodiments.

Step 508

A second part of the obtained first and second USF 310, 320 and the second data block 302 for the obtained second modulation technique are encoded.

Step 509

The encoded second part of the first and second USF 310, 320 and the encoded second data block 302 are modulated according to the obtained second modulation technique.

Step 510

The modulated second part of the first and second USF 310, 320 and the modulated second data block 302 are transmitted to the terminal 120.

The second data block 302 is to be sent during the following 10 ms of transmission, together with the second part of the first and second USF 310, 320, according to some embodiments.

The modulated second data block 302 may according to some optional embodiments be sent to another terminal 130 than the first data block 301.

Figure 6:
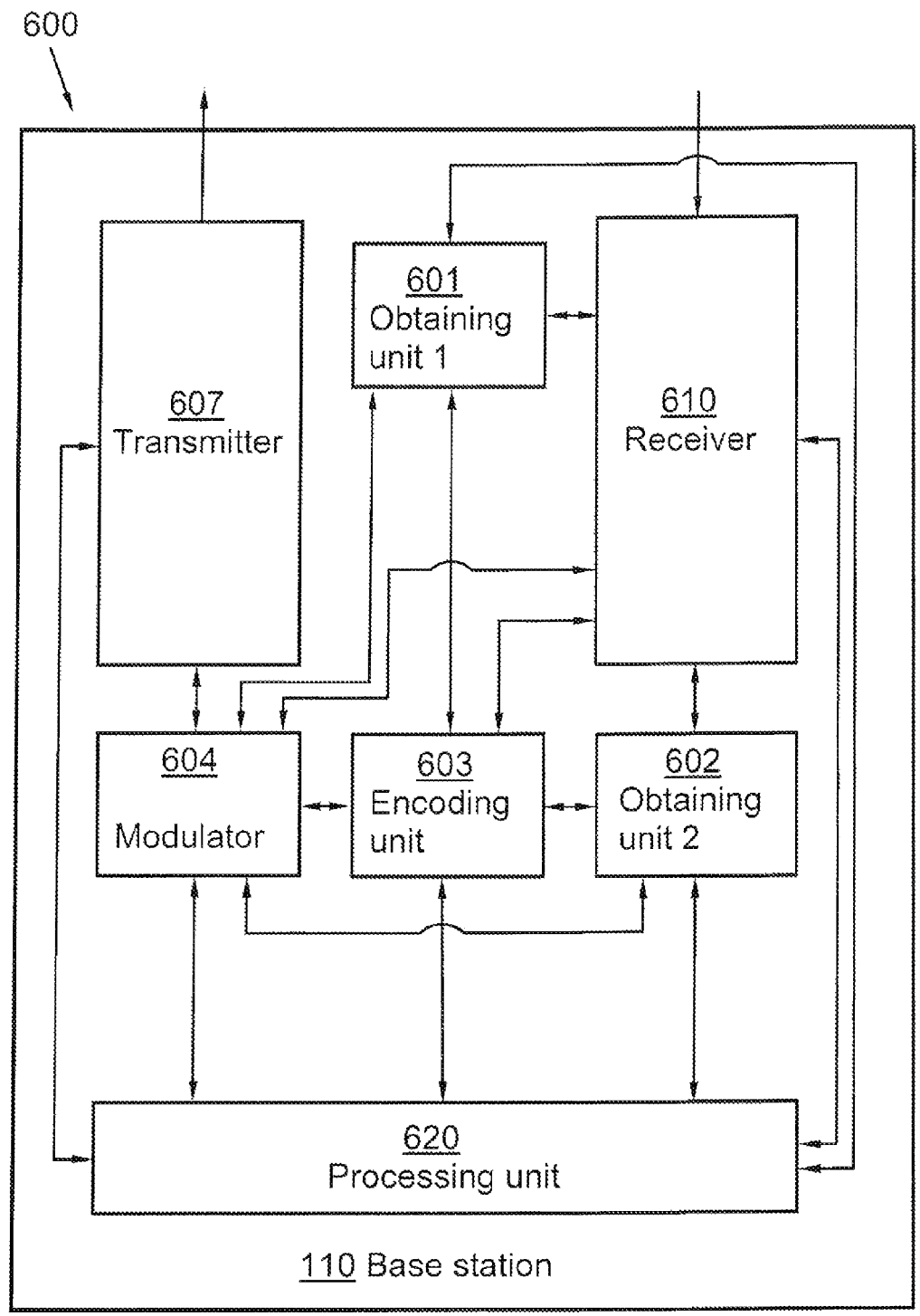
FIG. 6 is a block diagram illustrating embodiments of an arrangement in a base station.

FIG. 6 is a block diagram illustrating embodiments of an arrangement 600 situated in a base station 110. The arrangement 600 is configured to perform the method steps 501-510 for transmitting information data 300 to a terminal 120. The base station 110 and the terminal 120 are comprised within a wireless communication network 100. Optionally, the wireless communication network 100 may comprise a control node 140 and/or a further terminal 130. Further, the information data 300 comprises a first data block 301 and a second data block 302. The first and second data blocks 301, 302 are arranged to be transmitted to the same terminal 120 or to different terminals 120, 130.

For the sake of clarity, any internal electronics of the arrangement 600, not completely necessary for performing the present method has been omitted from FIG. 6.

The arrangement 600 comprises a first obtaining unit 601. The first obtaining unit 601 is adapted to obtain USF values 310, 320 to be sent across the first data block 301 and the second data block 302. Further, the arrangement 600 comprises a second obtaining unit 602. The second obtaining unit 602 are adapted to obtain a modulation technique associated with the first data block 301 and/or the second data block 302. Also, the arrangement 600 comprises an encoding unit 603. The encoding unit 603 is adapted to encode a part of the obtained USF values 310, 320 and the first data block 301 or the second data block 302 for the obtained modulation technique. In addition, the arrangement 600 further comprises a modulator unit 604. The modulator unit 604 is adapted to modulate a part of the encoded USF values 310, 320 and the first data block 301 or the second data block 302 according to the obtained modulation technique. Further yet, the arrangement 600 also comprises a transmitting unit 607. The transmitting unit 607 is adapted to transmit the modulated part of the USF values 310, 320 and the modulated data block to the terminal 120.

The arrangement 600 may according to some embodiments comprise a processing unit 620. The processing unit 620 may be represented by e.g. a Central Processing Unit (CPU), a processor, a microprocessor, or other processing logic that may interpret and execute instructions. The processing unit 620 may perform all data processing functions for inputting, outputting, and processing of data including data buffering and device control functions, such as call processing control, user interface control, or the like.

Also, the arrangement 600 optionally may comprise a transmitting unit 607 and/or a receiving unit 610.

It is to be noted that the described units 601-620 comprised within the arrangement 600 may be regarded as separate logical entities, but not with necessity as separate physical entities. Any, some or all of the units 601-620 may be comprised or co-arranged within the same physical unit. However, in order to facilitate the understanding of the functionality of the arrangement 600, the comprised units 601-620 are illustrated as separate physical units in FIG. 6.

Thus the transmitting unit 607 and e.g. the receiving unit 610 may, according to some embodiments, be comprised within one physical unit, a transceiver, which may comprise a transmitter circuit and a receiver circuit, which respectively transmits outgoing radio frequency signals to the terminals 120, 130 and receives incoming radio frequency signals from the terminals 120, 130 via an optional antenna. The antenna may be an embedded antenna, a retractable antenna or any other arbitrary antenna without departing from the scope of the present arrangements. The radio frequency signals transmitted between the base station 110 and the terminals 120, 130 may comprise both traffic and control signals e.g. paging signals/messages for incoming calls, which may be used to establish and maintain a voice call communication with another party or to transmit and/or receive data, such as SMS, e-mail or MMS messages, from one terminal 120 to/from another remote terminal 130.

Computer Program Product in a Base Station 110

The method steps 501-510 in the base station 110 may be implemented through one or more processing units 620 in the base station 110, together with computer program code for performing the functions of the present steps 501-510. Thus a computer program product, comprising instructions for performing the method steps 501-510 in the base station 110 may perform a method for transmission of information data 300 to the terminal 120.

The computer program product mentioned above may be provided for instance in the form of a data carrier carrying computer program code for performing the method steps 501-510 according to the present solution when being loaded into the processing unit 620. The data carrier may be e.g. a hard disk, a CD ROM disc, a memory stick, an optical storage device, a magnetic storage device or any other appropriate medium such as a disk or tape that can hold machine readable data. The computer program product may furthermore be provided as computer program code on a server and downloaded to the base station 110 remotely, e.g. over an Internet or an intranet connection.

The base station 110 and the terminal 120 are comprised within a wireless communication network 100. The information data 300 comprises a first data block 301 and a second data block 302. The first and second data blocks 301, 302 are arranged to be transmitted to the same terminal 120 or to different terminals 120, 130. The computer program product comprises instructions for obtaining a first Uplink State Flag 310 and a second Uplink State Flag 320, to be sent across the first data block 301 and the second data block 302. Further, the computer program product comprises instructions for obtaining a first modulation technique associated with the first data block 301. Also, the computer program product comprises instructions for encoding a first part of the obtained first and second USF 310, 320 and the first data block 301 for the obtained first modulation technique. In addition, the computer program product comprises instructions for modulating the encoded first part of the first and second USF 310, 320 and the encoded first data block 301, according to the obtained first modulation technique. In further addition, the computer program product comprises instructions for transmitting the modulated first part of the first and second USF 310, 320 and the modulated first data block 301. Additionally, the computer program product comprises instructions for obtaining a second modulation technique associated with the second data block 302. Furthermore, the computer program product comprises instructions for encoding a second part of the obtained first and second USF 310, 320 and the second data block 302 for the obtained second modulation technique. Also, further yet, the computer program product comprises instructions for modulating the encoded second part of the first and second USF 310, 320 and the encoded second data block 302 according to the obtained second modulation technique. Still further, the computer program product also comprises additional instructions for transmitting the modulated second part of the first and second USF 310, 320 and the modulated second data block 302, when the computer program product is run on a processing unit 620 comprised within the base station 110.

Figure 7:
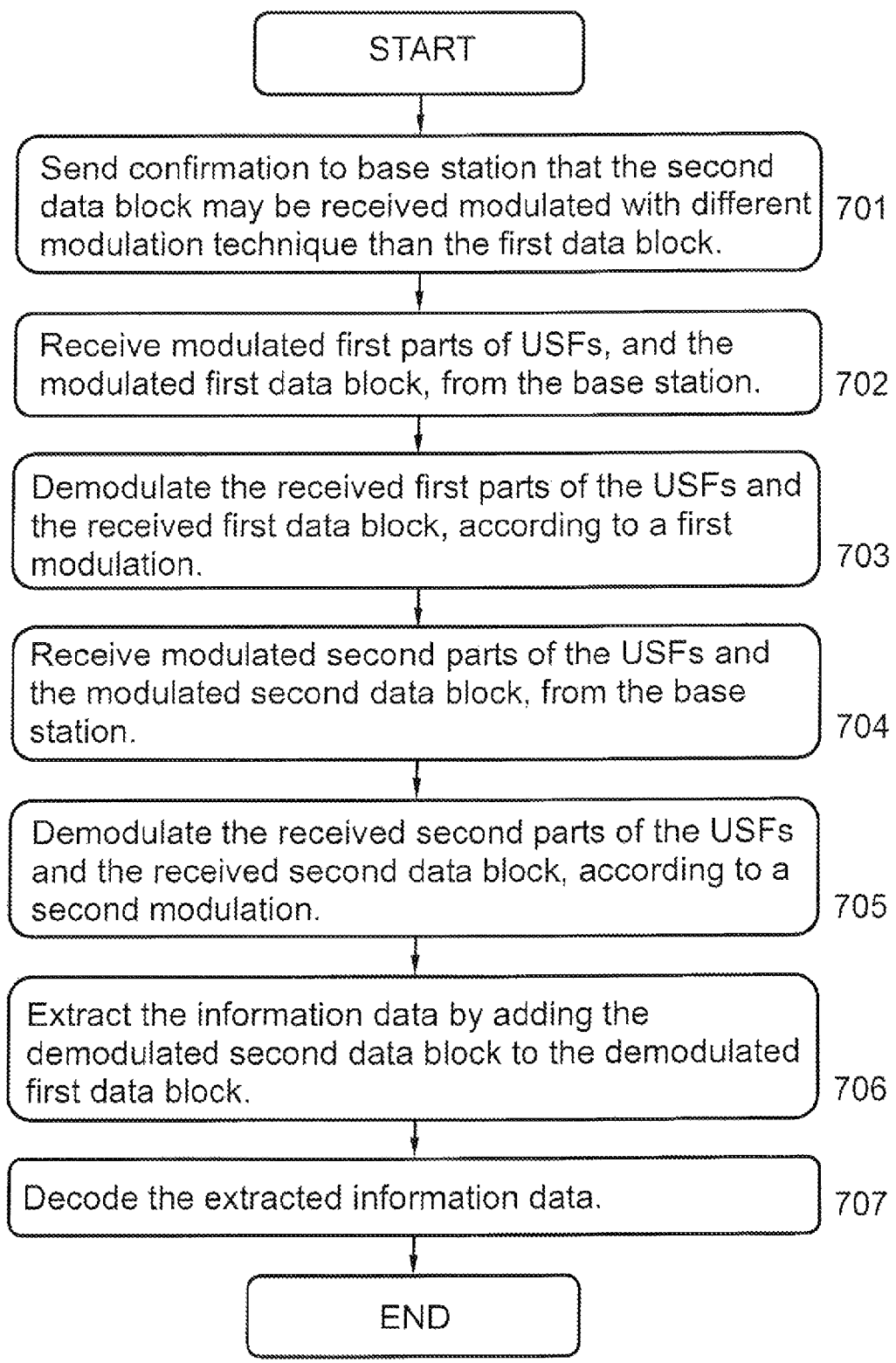
FIG. 7 is a schematic flow chart illustrating embodiments of a method in a terminal.

FIG. 7 is a flow chart illustrating embodiments of method steps 701-707 performed in a terminal 120. The method aims at receiving information data 300 from a base station 110. The base station 110 and the terminal 120 are comprised within a wireless communication network 100. The wireless communication network 100 may further comprise a control node 140 and/or a further terminal 130. The information data 300 comprises a first data block 301 and a second data block 302. The first and second data blocks 301, 302 are arranged to be transmitted to the same terminal 120 or to different terminals 120, 130.

To appropriately receive information data 300 from the base station 110, the method may comprise a number of method steps 701-707.

It is however to be noted that some of the described method steps 701-707 are optional and only comprised within some embodiments. Further, it is to be noted that the method steps 701-707 may be performed in any arbitrary chronological order and that some of them, e.g. step 701 and step 704, or even all steps 701-707 may be performed simultaneously or in an altered, arbitrarily rearranged, decomposed or even completely reversed chronological order, according to different embodiments. The method may comprise the following steps:

Step 701

This step is optional and may only be performed within some embodiments.

A confirmation may be sent to the base station 110, confirming that the terminal 120 is adapted to receive the second data block 302 modulated with a different modulation technique than the first data block 301.

The confirmation may indicate, according to some optional embodiments, that the terminal 120 supports Reduced Latency and/or EGPRS2. Thus it may not explicitly be necessary to confirm that mixed modulations USF is supported, as the feature of mixed modulations USF is supported by terminals 120, 130 supporting Reduced Latency and/or EGPRS2.

Step 702

A modulated first part of a first USF value 310 and a second USF value 320, and the modulated first data block 301 are received from the base station 110.

The first data block 301 may be received during the first 10 ms of the reception together with the first part of the first and second USF 310, 320, according to some embodiments.

Step 703

The received first part of the first and second USF 310, 320 and the received first data block 301, according to a first modulation technique are demodulated.

The modulation technique associated with the first data block 301 may according to some optional embodiments be any modulation technique of: GMSK, 8PSK, 16QAM and 32QAM at normal symbol rate, or QPSK, 16QAM and 32QAM at high symbol rate.

Step 704

A modulated second part of the first and second USF 310, 320 and the modulated second data block 302 are received from the base station 110.

The second data block 302 may be received during the following 10 ms of the reception, together with the second part of the first and second USF 310, 320, according to some embodiments.

Step 705

The received second part of the first and second USF 310, 320 and the received second data block 302 are demodulated, according to a second modulation technique.

The modulation technique associated with the second data block 302 may according to some optional embodiments be any modulation technique of: GMSK, 8PSK, 16QAM and 32QAM at normal symbol rate, or QPSK, 16QAM and 32QAM at high symbol rate.

Step 706

The information data is extracted by adding the demodulated second data block 302 to the demodulated first data block 301.

Step 707

The extracted information data 300 is decoded.

Figure 8:
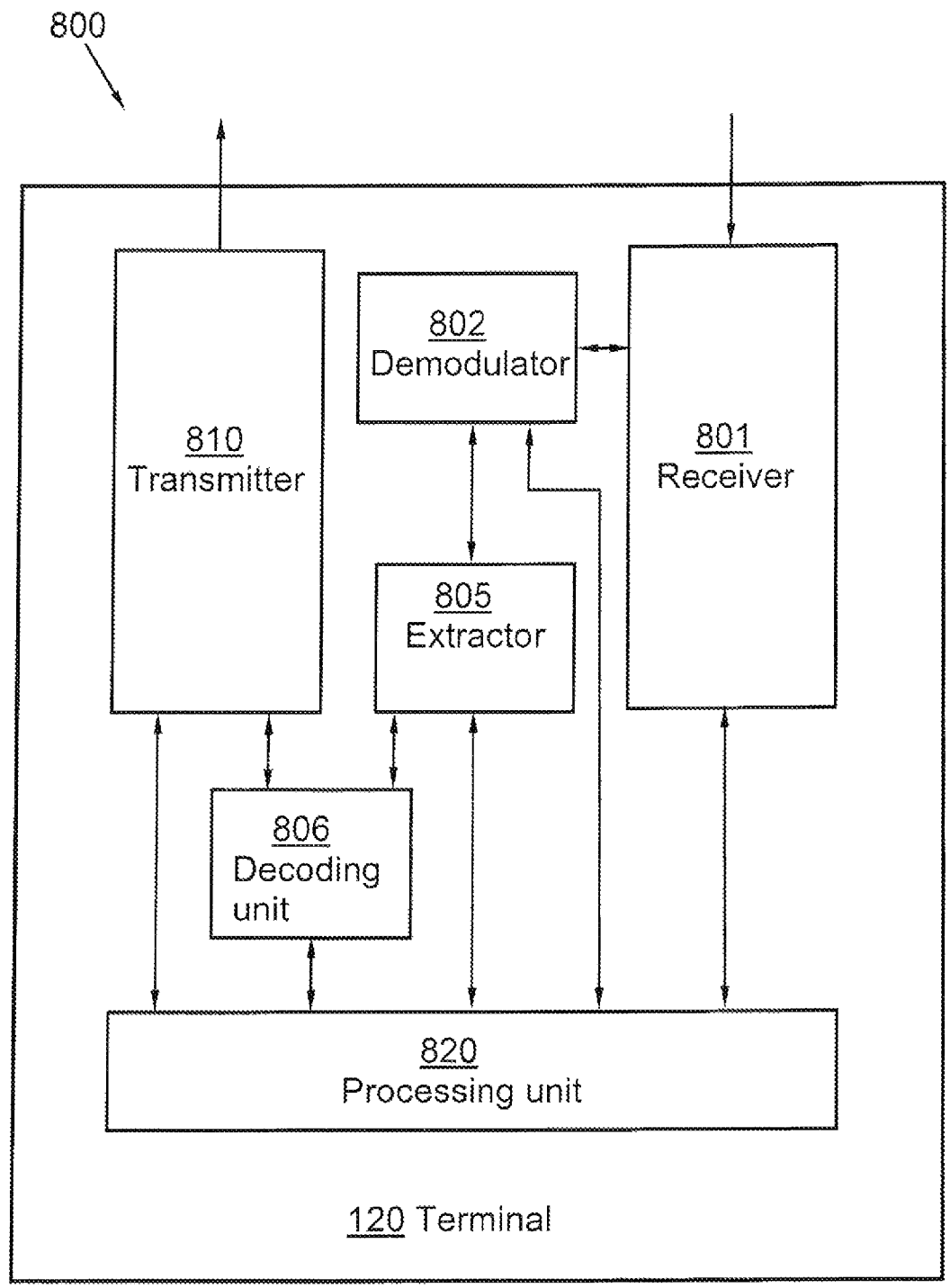
FIG. 8 is a block diagram illustrating embodiments of an arrangement in a terminal.

FIG. 8 is a block diagram illustrating embodiments of an arrangement 800 situated in a terminal 120. The arrangement 800 is configured to perform the method steps 701-707 for receiving information data 300 from a base station 110. The base station 110 and the terminal 120 are comprised within a wireless communication network 100. Optionally, the wireless communication network 100 may comprise a control node 140 and/or a further terminal 130. Further, the information data 300 comprises a first data block 301 and a second data block 302. The first and second data blocks 301, 302 are arranged to be transmitted to the same terminal 120 or to different terminals 120, 130.

For the sake of clarity, any internal electronics of the arrangement 800, not completely necessary for performing the present method has been omitted from FIG. 8.

The arrangement 800 comprises a receiving unit 801. The receiving unit 801 is adapted to receive a modulated part of a first Uplink State Flag 310 and a second Uplink State Flag 320, and a modulated data block 301, 302 from the base station 110. Further, the arrangement 800 also comprises a demodulation unit 802. The demodulation unit 802 is adapted to demodulate the received part of the first and second USF 310, 320 and the received data block 301, 302. Also, the arrangement 800 further, in addition, comprises an extracting unit 804. The extracting unit 804 is adapted to extract the information data by adding a demodulated data block 302 to another demodulated data block 301. Additionally, the arrangement 800 also, further comprises a decoding unit 805. The decoding unit 805 is adapted to decode the extracted information data 300.

The arrangement 800 may according to some embodiments comprise a processing unit 820. The processing unit 820 may be represented by e.g. a CPU, a processor, a microprocessor, or other processing logic that may interpret and execute instructions. The processing unit 820 may perform all data processing functions for inputting, outputting, and processing of data including data buffering and device control functions, such as call processing control, user interface control, or the like.

Also, the arrangement 800 may optionally comprise a transmitting unit 810 and/or a receiving unit 801.

It is to be noted that the described units 801-820 comprised within the arrangement 800 may be regarded as separate logical entities, but not with necessity as separate physical entities. Any, some or all of the units 801-820 may be comprised or co-arranged within the same physical unit. However, in order to facilitate the understanding of the functionality of the arrangement 800, the comprised units 801-820 are illustrated as separate physical units in FIG. 8.

Thus the receiving unit 801 and e.g. the transmitting unit 810 may, according to some embodiments, be comprised within one physical unit, a transceiver, which may comprise a transmitter circuit and a receiver circuit, which respectively transmits outgoing radio frequency signals to the base station 110 and receives incoming radio frequency signals from the base station 110 via an optional antenna. The antenna may be an embedded antenna, a retractable antenna or any other arbitrary antenna without departing from the scope of the present arrangements. The radio frequency signals transmitted between the base station 110 and the terminals 120, 130 may comprise both traffic and control signals e.g., paging signals/messages for incoming calls, which may be used to establish and maintain a voice call communication with another party or to transmit and/or receive data, such as SMS, e-mail or MMS messages, from one terminal 120 to/from another remote terminal 130.

Computer Program Product in a Terminal 120

The method steps 701-707 in the terminal 120 may be implemented through one or more processing units 820 in the terminal 120, together with computer program code for performing the functions of the present steps 701-707. Thus a computer program product, comprising instructions for performing the method steps 701-707 in the terminal 120 may receive information data 300 from the base station 110.

The computer program product mentioned above may be provided for instance in the form of a data carrier carrying computer program code for performing the method steps according to the present solution when being loaded into the processing unit 820. The data carrier may be e.g. a hard disk, a CD ROM disc, a memory stick, an optical storage device, a magnetic storage device or any other appropriate medium such as a disk or tape that can hold machine readable data. The computer program product may furthermore be provided as computer program code on a server and downloaded to the terminal 120 remotely, e.g. over an Internet or an intranet connection.

The base station 110 and the terminal 120 are comprised within a wireless communication network 100. The information data 300 comprises a first data block 301 and a second data block 302. The first and second data blocks 301, 302 are arranged to be transmitted to the same terminal 120 or to different terminals 120, 130. The computer program product comprises instructions for receiving a modulated first part of a first and second USF 310, 320 and the modulated first data block 301, from the base station 110. Also, the computer program product comprises instructions for demodulating the received first part of the first and second USF 310, 320 and the received first data block 301, according to a first modulation technique. Further, the computer program product also comprises instructions for receiving a modulated second part of the first and second USF 310, 320 and the modulated second data block 302, from the base station 110. Additionally, the computer program product also comprises further instructions for demodulating the received second part of the first and second USF 310, 320 and the received second data block 302, according to a second modulation technique. Further yet, the computer program product in addition also comprises instructions for extracting the information data by adding the demodulated second data block 302 to the demodulated first data block 301. Still further, the computer program product also, further, comprises additional instructions for decoding the extracted information data 300 when the computer program product is run on a processing unit 820 comprised within the terminal 120.

Figure 9:
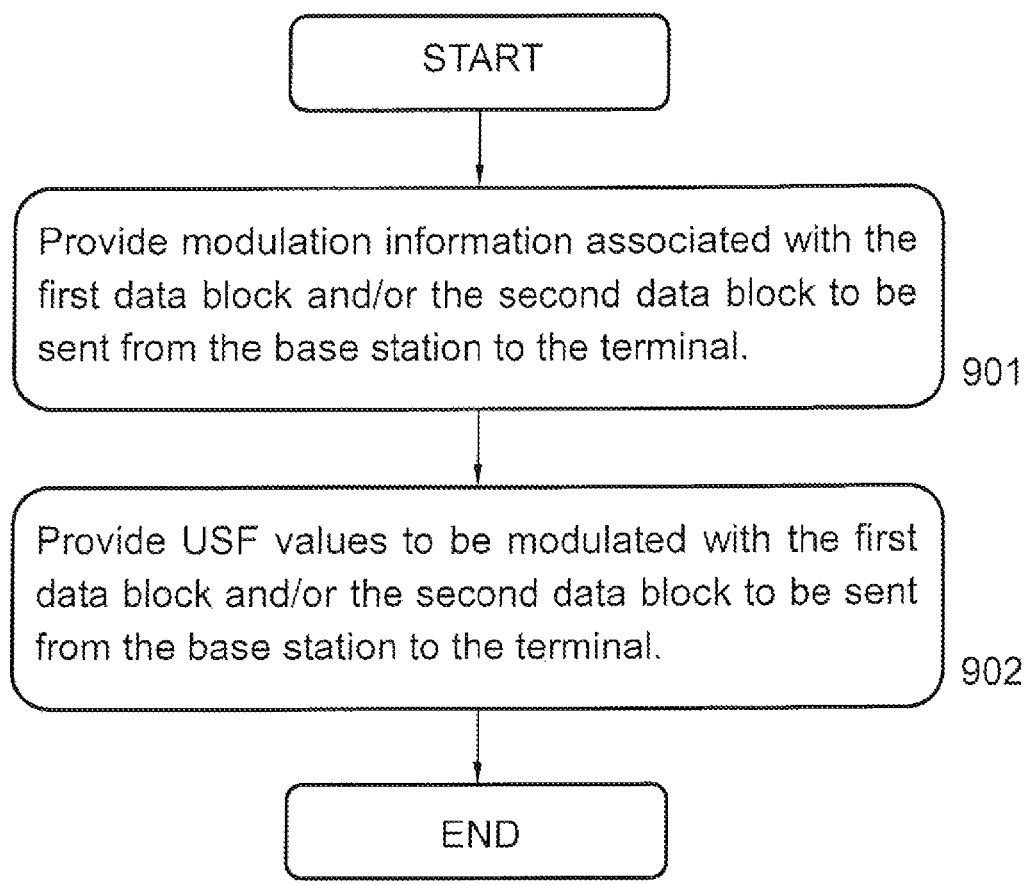
FIG. 9 is a schematic flow chart illustrating embodiments of a method in a control node.

FIG. 9 is a flow chart illustrating embodiments of method steps 901-902 performed in a control node 140. The method aims at supporting a base station 110 in transmitting information data 300 to a terminal 120. The control node 140, the base station 110 and the terminal 120 are comprised within a wireless communication network 100. The wireless communication network 100 may further comprise a control node 140 and/or a further terminal 130. The information data 300 comprises a first data block 301 and a second data block 302. The first and second data blocks 301, 302 are arranged to be transmitted to the same terminal 120 or to different terminals 120, 130.

To appropriately support the base station 110 in transmitting information data 300 to a terminal 120, the method may comprise a number of method steps 901-902.

It is however to be noted that the method steps 901-902 may be performed in any arbitrary chronological order and that some of them, e.g. step 901 and step 902, or even all the two steps 901-902 may be performed simultaneously or in an altered, arbitrarily rearranged, decomposed or even completely reversed chronological order, according to different embodiments. The method may comprise the following steps:

Step 901

Modulation information associated with the first data block 301 and/or the second data block 302 to be sent from the base station 110 to the terminal 120 are provided.

Step 902

A first and second USF value 310, 320 associated with the first data block 301 and/or the second data block 302 to be sent from the base station 110 to the terminal 120 are provided.

Figure 10:
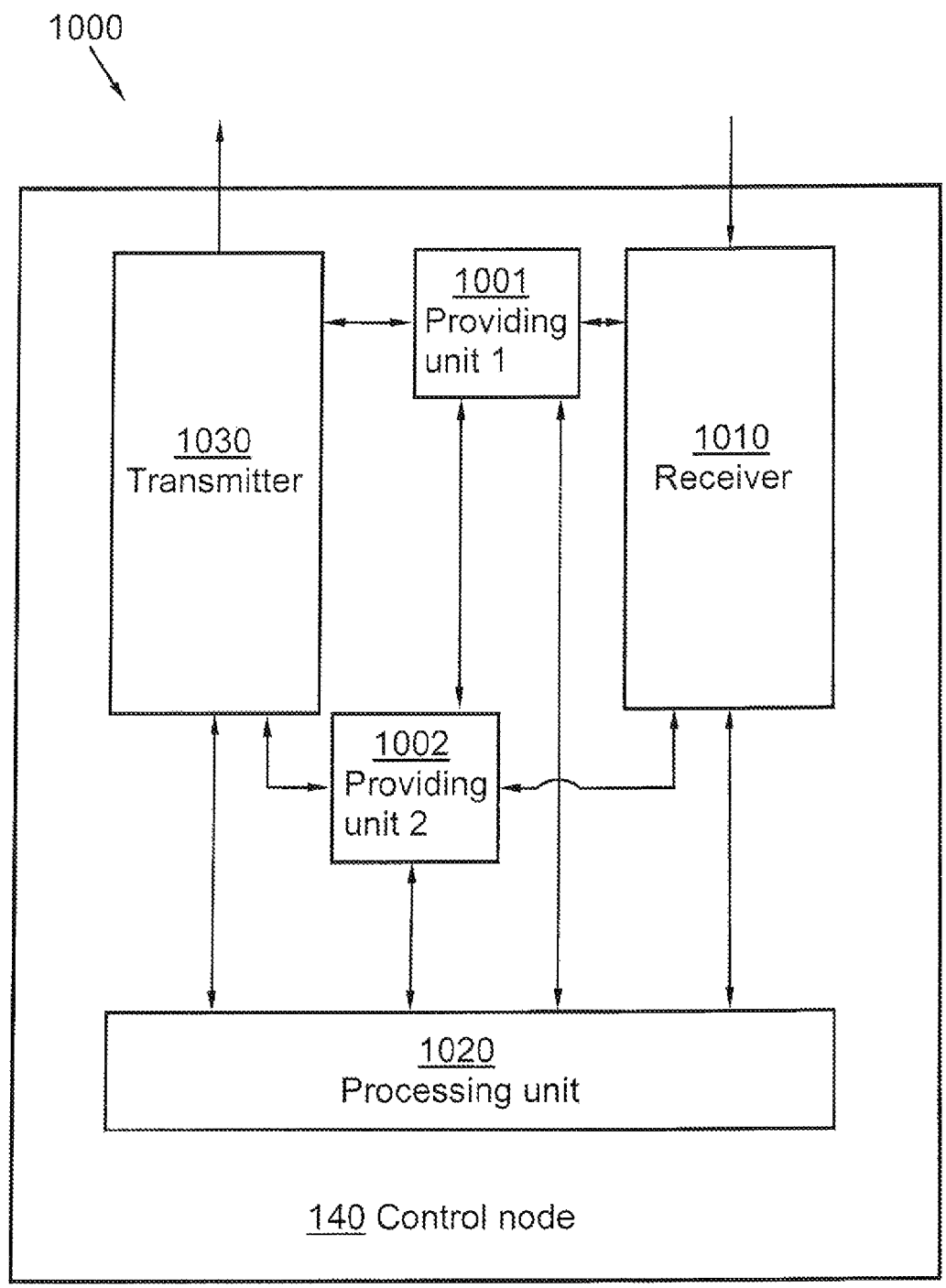
FIG. 10 is a block diagram illustrating embodiments of an arrangement in a control node.

FIG. 10 is a block diagram illustrating embodiments of an arrangement 1000 situated in a control node 140. The arrangement 1000 is configured to perform the method steps 901-902 for supporting a base station 110 in transmitting information data 300 to a terminal 120. The control node 140, the base station 110 and the terminal 120 are comprised within a wireless communication network 100. The information data 300 comprises a first data block 301 and a second data block 302.

For the sake of clarity, any internal electronics of the arrangement 1000, not completely necessary for performing the present method has been omitted from FIG. 10.

The arrangement 1000 comprises a first providing unit 1001. The first providing unit 1001 is adapted to provide modulation information associated with the first data block 301 and/or the second data block 302 to be sent from the base station 110 to the terminal 120.

Further, the arrangement 1000 also comprises a second providing unit 1002. The second providing unit 1002 is adapted to provide an USF value 310 associated with the first data block 301 and/or the second data block 302 to be sent from the base station 110 to the terminal 120. The first and second USF value 310, 320 are modulated together with the first data block 301 and the second data block 302. Also, the first data block 301 and the second data block 302 do not have to be sent to the same terminal 120.

The arrangement 1000 may according to some embodiments comprise a processing unit 1020. The processing unit 1020 may be represented by e.g. a CPU, a processor, a microprocessor, or other processing logic that may interpret and execute instructions. The processing unit 1020 may perform all data processing functions for inputting, outputting, and processing of data including data buffering and device control functions, such as call processing control, user interface control, or the like.

Computer Program Product in a Control Node 140

The method steps 901-902 in the control node 140 may be implemented through one or more processor units 1020 in the control node 140, together with computer program code for performing the functions of the present steps 901-902. Thus a computer program product, comprising instructions for performing the method steps 901-902 in the control node 140 for supporting a base station 110 in transmitting information data 300 to a terminal 120.

The computer program product mentioned above may be provided for instance in the form of a data carrier carrying computer program code for performing the method steps 901-902, according to the present solution when being loaded into the processor unit 1020. The data carrier may be e.g. a hard disk, a CD ROM disc, a memory stick, an optical storage device, a magnetic storage device or any other appropriate medium such as a disk or tape that can hold machine readable data. The computer program product may furthermore be provided as computer program code on a server and downloaded to the control node 140 remotely, e.g. over an Internet or an intranet connection.

The base station 110 and the terminal 120 are comprised within a wireless communication network 100. The information data 300 comprises a first data block 301 and a second data block 302. The first and second data blocks 301, 302 are arranged to be transmitted to the same terminal 120 or different terminals 120, 130. The computer program product comprises instructions for providing modulation information associated with the first data block 301 and/or the second data block 302 to be sent from the base station 110 to the terminal 120. Also, the computer program product further comprises instructions for providing a first and second USF 310, 320 associated with the first data block 301 and/or the second data block 302 to be sent from the base station 110 to the terminal 120, when the computer program product is run on a processing unit 1020 comprised within the control node 140. The first and second USF 310, 320 are modulated together with the first data block 301 and the second data block 302. Also, the first data block 301 and the second data block 302 do not have to be intended for the same terminal 120.

The terminology used in the detailed description of the particular exemplary embodiments illustrated in the accompanying drawings is not intended to be limiting of the invention.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

The invention claimed is:

1. A method, in a base station, for modulating information intended for transmission to a terminal, wherein the base station, the terminal, and a control node are part of a wireless communication network, and wherein the information comprises first and second data blocks, the method comprising:
    obtaining a first Uplink State Flag (USF) value and a second USF value to be sent across the first data block and the second data block;
    encoding a first part of the first USF value, a first part of the second USF value, and the first data block for a first modulation technique;
    modulating the encoded first parts of the first and second USF values and the encoded first data block according to the first modulation technique;
    encoding a second part of the first USF value, a second part of the second USF value, and the second data block for a second modulation technique, different from the first modulation technique; and
    modulating the encoded second parts of the first and second USF values and the encoded second data block according to the second modulation technique.

2. The method of claim 1, further comprising transmitting the modulated first data block and the modulated first parts of the first and second USF values to the terminal, and transmitting the modulated second data block and the modulated second parts of the first and second USF values to the terminal.

3. The method of claim 1, wherein at least one of the first and second modulation techniques comprises one of Gaussian Minimum Shift Keying, 8-Phase-shift keying, 16-Quadrature Amplitude Modulation, and 32-Quadrature Amplitude Modulation, at normal symbol rate; or Quadrature Phase-Shift Keying, 16-Quadrature Amplitude Modulation, and 32-Quadrature Amplitude Modulation, at high symbol rate.

4. The method of claim 1, further comprising obtaining at least one of the first and second modulation techniques and the first and second USF values from the control node.

5. The method of claim 1, further comprising receiving a confirmation from the terminal that the terminal is adapted to receive data blocks modulated with the second modulation technique.

6. The method of claim 2, wherein transmitting the modulated first data block and the modulated first parts of the first and second USF values comprises transmitting the modulated first data block during a first ten milliseconds of transmission together with the modulated first parts of the first and second USF values, and wherein transmitting the modulated second data block and the modulated second parts of the first and second USF values comprises transmitting the modulated second data block during a subsequent ten milliseconds of transmission together with the modulated second parts of the first and second USF values.

7. An arrangement in a base station for modulating information intended for transmission to a terminal, wherein the base station, the terminal, and a control node are part of a wireless communication network, and wherein the information comprises first and second data blocks, the arrangement comprising:
    an obtaining circuit adapted to obtain a first Uplink State Flag (USF) value and a second USF value to be sent across the first data block and the second data block;
    an encoder adapted to encode a first part of the first USF value, a first part of the second USF value, and the first data block for a first modulation technique, the encoder further adapted to encode a second part of the first USF value, a second part of the second USF value, and the second data block for a second modulation technique, different from the first modulation technique; and
    a modulator adapted to modulate the encoded first parts of the first and second USF values and the encoded first data block according to the first modulation technique, the modulator further adapted to modulate the encoded second parts of the first and second USF values and the encoded second data block according to the second modulation technique.

8. A computer program product comprising instructions stored in a non-transitory computer readable medium for modulating information intended for transmission from a base station to a terminal when the instructions are executed on a processing circuit comprised within the base station, wherein the base station, the terminal, and a control node are part of a wireless communication network, and wherein the information comprises a first data block and a second data block, the instructions causing the processing circuit to:
    obtain a first Uplink State Flag (USF) value and a second USF value to be sent across the first data block and the second data block;
    encode a first part of the first USF value, a first part of the second USF value, and the first data block for a first modulation technique;
    modulate the encoded first parts of the first and second USF values and the encoded first data block according to the first modulation technique;
    encode a second part of the first USF value, a second part of the second USF value, and the second data block for a second modulation technique different from the first modulation technique; and
    modulate the encoded second parts of the first and second USF values and the encoded second data block according to the second modulation technique.

9. A method, in a terminal, for demodulating information received at the terminal from a base station, wherein the base station and the terminal are part of a wireless communication network, and wherein the information comprises a first data block and a second data block, the method comprising:
- receiving, from the base station, a modulated first part of a first Uplink State Flag (USF) value, a modulated first part of a second USF value, and a modulated first data block;
- demodulating the modulated first parts of the first and second USF values and the modulated first data block according to a first modulation technique;
- receiving, from the base station, a modulated second part of the first USF value, a modulated second part of the second USF value, and a modulated second data block; and
- demodulating the modulated second parts of the first and second USF values and the modulated second data block according to a second modulation technique different from the first modulation technique.

10. The method of claim 9, wherein receiving the modulated first parts of the first and second USF values and the modulated first data block comprises receiving the modulated first data block during the first ten milliseconds of the reception together with the first parts of the first and second USF values, and wherein receiving the modulated second parts of the first and second USF values and the modulated second data block comprises receiving the modulated second data block during a subsequent ten milliseconds of the reception together with the second parts of the first and second USF values.

11. The method of claim 9, wherein at least one of the first and second modulation techniques comprises one of Gaussian Minimum Shift Keying, 8-Phase-shift keying, 16-Quadrature Amplitude Modulation, and 32-Quadrature Amplitude Modulation, at normal symbol rate; or Quadrature Phase-Shift Keying, 16-Quadrature Amplitude Modulation, and 32-Quadrature Amplitude Modulation, at high symbol rate.

12. The method of claim 9, further comprising sending a confirmation to the base station that the terminal is adapted to receive data blocks modulated with the second modulation technique.

13. The method of claim 9 further comprising:
- extracting the information corresponding to the first USF value and extracting the information corresponding to the second USF value; and
- decoding the extracted information by decoding the demodulated first data block and the demodulated first parts of the first and second USF values according to the first modulation technique and decoding the demodulated second data block and the demodulated second parts of the first and second USF values according to the second modulation technique.

14. An arrangement in a terminal for demodulating information received from a base station, wherein the base station and the terminal are part of a wireless communication network, and wherein the information comprises a first data block and a second data block, the arrangement comprising:
- a receiver adapted to receive, from the base station, a modulated first part of a first Uplink State Flag (USF) value, a modulated first part of a second USF value, and a modulated first data block, the receiver being further adapted to receive, from the base station, a modulated second part of the first USF value, a modulated second part of the second USF value, and a modulated second data block; and
- a demodulator adapted to demodulate the modulated first parts of the first and second USF values and the modulated first data block according to a first modulation technique, the demodulator further being adapted to demodulate the modulated second parts of the first and second USF values and the modulated second data block according to a second modulation technique different from the first modulation technique.

15. The arrangement of claim 14 further comprising:
- an extracting circuit adapted to extract the information; and
- a decoder adapted to decode the extracted information by decoding the demodulated first data block according to the first modulation technique, and by decoding the demodulated second data block according to the second modulation technique.

16. A computer program product comprising instructions stored in a non-transitory computer readable medium for demodulating information received from a base station when the instructions are executed on a processing circuit comprised within a terminal, wherein the base station and the terminal are part of a wireless communication network, and wherein the information comprises a first data block and a second data block, the instructions causing the processing circuit to:
- receive, from the base station, a modulated first part of a first Uplink State Flag (USF) value, a modulated first part of a second USF value, and a modulated first data block;
- demodulate the first parts of the first and second USF values and the modulated first data block according to a first modulation technique;
- receive, from the base station, a modulated second part of the first USF value, a modulated second part of the second USF value, and a modulated second data block; and
- demodulate the second parts of the first and second USF values and the modulated second data block according to a second modulation technique different from the first modulation technique.

17. The computer program product of claim 16 further comprising instructions to:
- extract the information; and
- decode the extracted information by decoding the demodulated first data block according to the first modulation technique and by decoding the demodulated second data block according to the second modulation technique.

18. A method in a control node for supporting a base station in modulating information intended for transmission from the base station to a terminal, wherein the control node, the base station, and the terminal are part of a wireless communication network, and wherein the information comprises a first data block and a second data block, the method comprising:
- generating first modulation information associated with the first data block;
- generating second modulation information associated with the second data block, the second modulation information being different from the first modulation information;
- generating a first Uplink State Flag (USF) value and a second USF value, wherein a first part of each of the first and second USF values is associated with the first data block, and wherein a second part of each of the first and second USF values is associated with the second data block;
- providing, to the base station, the first and second modulation information; and
- providing, to the base station, the first USF value and the second USF value to enable the base station to modulate the first data block and the first part of each of the first and second USF values according to the first modulation information and to modulate the second data block and the second part of each of the first and second USF values according to the second modulation information.

19. An arrangement in a control node for supporting a base station in modulating information intended for transmission from the base station to a terminal, wherein the control node, the base station and the terminal are part of a wireless communication network, and wherein the information comprises a first data block and a second data block, the arrangement configured to:
   generate first modulation information associated with the first data block;
   generate second modulation information associated with the second data block, the second modulation information being different from the first modulation information;
   generate a first Uplink State Flag (USF) value and a second USF value, wherein a first part of each of the first and second USF values is associated with the first data block, and wherein a second part of each of the first and second USF values is associated with the second data block;
the arrangement comprising:
   a first providing circuit adapted to provide, to the base station, the first and second modulation information; and
   a second providing circuit adapted to provide, to the base station, the first USF value and the second USF value to enable the base station to modulate the first data block and the first part of each of the first and second USF values according to the first modulation information and to modulate the second data block and the second part of each of the first and second USF values according to the second modulation information.

20. A computer program product comprising instructions stored in a non-transitory computer readable medium for supporting a base station in modulating information intended for transmission from the base station to a terminal when the instructions are executed on a processing circuit within the control node, wherein the control node, the base station, and the terminal are part of a wireless communication network, and wherein the information comprises a first data block and a second data block, the instructions causing the processing circuit to:
   generate first modulation information associated with the first data block;
   generate second modulation information associated with the second data block, the second modulation information being different from the first modulation information;
   generate a first Uplink State Flag (USF) value and a second USF value, wherein a first part of each of the first and second USF values is associated with the first data block, and wherein a second part of each of the first and second USF values is associated with the second data block;
   provide, to the base station, the first and second modulation information; and
   provide, to the base station, the first USF value and the second USF value to enable the base station to modulate the first data block and the first part of each of the first and second USF values according to the first modulation information and to modulate the second data block and the second part of each of the first and second USF values according to the second modulation information.

* * * * *